(12) United States Patent
Satou et al.

(10) Patent No.: US 7,745,506 B2
(45) Date of Patent: Jun. 29, 2010

(54) UV-CURABLE INK-JET INK, ELECTRONIC CIRCUIT BOARD, ELECTRONIC COMPONENT AND DISPLAY DEVICE

(75) Inventors: Hiroyuki Satou, Chiba (JP); Setsuo Itami, Chiba (JP); Fumitaka Ooizumi, Chiba (JP); Toshiyuki Takahashi, Chiba (JP)

(73) Assignee: Chisso Corporation, Osaka (JP)

( * ) Notice: Subject to any disclaimer, the term of this patent is extended or adjusted under 35 U.S.C. 154(b) by 160 days.

(21) Appl. No.: 11/776,091

(22) Filed: Jul. 11, 2007

(65) Prior Publication Data

US 2008/0038570 A1    Feb. 14, 2008

(30) Foreign Application Priority Data

Aug. 11, 2006  (JP) .............................. 2006-219800
Apr. 11, 2007  (JP) .............................. 2007-103582

(51) Int. Cl.
*C09D 11/02* (2006.01)
*C08F 2/50* (2006.01)
*G03F 7/004* (2006.01)

(52) U.S. Cl. ..................... 522/39; 522/168; 522/170; 522/173; 522/182; 522/183; 522/103

(58) Field of Classification Search ................ 522/182, 522/183, 39, 167, 168, 170, 103
See application file for complete search history.

(56) References Cited

U.S. PATENT DOCUMENTS

| | | | | |
|---|---|---|---|---|
| 6,114,404 A * | 9/2000 | Deeken et al. | ................ | 522/88 |
| 6,767,980 B2 * | 7/2004 | Yurugi et al. | ................ | 526/320 |
| 6,880,932 B2 * | 4/2005 | Doshi | ................ | 351/162 |
| 7,026,368 B2 * | 4/2006 | Yamada et al. | ................ | 522/83 |
| 7,037,952 B2 * | 5/2006 | Itoh et al. | ................ | 522/6 |
| 7,059,710 B2 * | 6/2006 | Ishikawa | ................ | 347/68 |
| 7,182,453 B2 * | 2/2007 | Nakajima | ................ | 347/102 |
| 7,462,653 B2 * | 12/2008 | Kakinuma et al. | ................ | 522/100 |
| 7,473,444 B2 * | 1/2009 | Seko et al. | ................ | 427/493 |

FOREIGN PATENT DOCUMENTS

WO    WO 2004/099272 A1    11/2004

* cited by examiner

*Primary Examiner*—Susan W Berman
(74) *Attorney, Agent, or Firm*—J.C. Patents

(57) ABSTRACT

A UV-curable ink-jet ink is provided, which has a high sensitivity and allows soft and highly fine patterns to be formed. The UV-curable ink-jet ink includes a mono-functional polymerizable monomer (A) having a hydroxyl group, a di(meth)acrylate ester (B) and a photo-polymerization initiator (C).

6 Claims, No Drawings

UV-CURABLE INK-JET INK, ELECTRONIC CIRCUIT BOARD, ELECTRONIC COMPONENT AND DISPLAY DEVICE

CROSS-REFERENCE TO RELATED APPLICATION

This application claims the priority benefits of Japanese applications Ser. Nos. 2006-219800 and 2007-103582, filed Aug. 11, 2006 and Apr. 11, 2007, respectively. All disclosure of the Japanese applications is incorporated herein by reference.

BACKGROUND OF THE INVENTION

1. Field of the Invention

This invention relates to a UV-curable ink-jet ink for fabricating liquid crystal display devices, electroluminescence display devices, electronic circuit boards and so on, to a UV-cured film formed by using the same, and to a display device and an electronic circuit board comprising the UV-cured film.

2. Description of Related Art

Methods of forming desired patterns on a substrate by ink-jet printing with a UV-curable ink-jet ink at a lower cost are well known. Moreover, for this application, various UV-curable ink-jet inks have been proposed, as described in WO2004/099272, for example. In recent years, UV-curable ink-jet inks are required to be capable of being set with less irradiation energy (i.e., having a high sensitivity), forming a soft film suitably to be formed on a flexible substrate and forming highly fine patterns, while the UV-curable ink-jet inks in the prior art have the following problems. Highly fine patterns cannot be formed with them, since the ink diffuses widely after the ink droplet is dropped on a substrate. Additionally, as the ink has a high sensitivity, the film is formed harder.

SUMMARY OF THE INVENTION

Problems to be Solved by the Invention

In view of the above, a UV-curable ink-jet ink having a high sensitivity and allowing soft and highly fine patterns to be formed is desired.

Solutions for the Problems

After performing various researches on the composition of UV-curable ink-jet ink, the inventors discovered that a UV-curable ink-jet ink comprising a mono-functional polymerizable monomer (A) having a hydroxyl group, a di(meth)acrylate ester (B) and a photo-polymerization initiator (C) has a high sensitivity and allows soft and highly fine patterns to be formed. This invention is accomplished based on the discovery.

Accordingly, this invention provides a UV-curable ink-jet ink, a UV-cured film fabricated by using the same, and a display device and an electronic circuit board comprising the UV-cured film.

Additionally, in the specification, acrylate and methacrylate are both expressed as (meth)acrylate to indicate the two simultaneously.

This invention includes the following. The $1^{st}$ item is a UV-curable ink-jet ink comprising a mono-functional polymerizable monomer (A) having a hydroxyl group, a di(meth)acrylate ester (B) and a photo-polymerization initiator (C).

The $2^{nd}$ item is a UV-curable ink-jet ink of the $1^{st}$ item, wherein the mono-functional polymerizable monomer (A) having a hydroxyl group is a compound of formula (1):

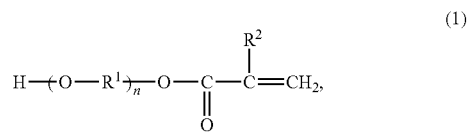

wherein $R^1$ is a $C_2$-$C_{12}$ alkylene group which may have a ring structure, $R^2$ is a $C_1$-$C_3$ alkyl group or hydrogen, and n is an integer of 1-30.

The $3^{rd}$ item is a UV-curable ink-jet ink of the $1^{st}$ or $2^{nd}$ item, wherein the di(meth)acrylate ester (B) is one or more selected from the group consisting of diacrylate modified by bisphenol-F ethylene oxide, diacrylate modified by bisphenol-A ethylene oxide, diacrylate modified by ethylene oxide isocyanurate, polyethyleneglycol diacrylate, polypropyleneglycol diacrylate, pentaerythritol diacrylate, pentaerythritol diacrylate monostearate, 1,4-butanediol diacrylate, 1,6-hexanediol diacrylate, 1,9-nonanediol diacrylate, 1,4-cyclohexanedimethanol diacrylate, 2-n-butyl-2-ethyl-1,3-propanediol diacrylate, trimethylolpropane diacrylate and dipentaerythritol diacrylate.

The $4^{th}$ item is a UV-curable ink-jet ink of the $1^{st}$ or $2^{nd}$ item, wherein the di(meth)acrylate ester (B) is one or more selected from the group consisting of diacrylate modified by bisphenol-F ethylene oxide, diacrylate modified by bisphenol-A ethylene oxide and diacrylate modified by ethylene oxide isocyanurate.

The $5^{th}$ item is a UV-curable ink-jet ink of the $1^{st}$ item, wherein the mono-functional polymerizable monomer (A) having a hydroxyl group is 4-hydroxybutyl (meth)acrylate or 1,4-cyclohexanedimethanol mono(meth)acrylate, the di(meth)acrylate ester (B) is one or more selected from the group consisting of diacrylate modified by bisphenol-F ethylene oxide, diacrylate modified by bisphenol-A ethylene oxide and diacrylate modified by ethylene oxide isocyanurate, and the photo-polymerization initiator (C) is 2-benzyl-2-dimethylamino-1-(4- morpholinophenyl)-1-butanone.

The $6^{th}$ item is a UV-curable ink-jet ink of any one of the $1^{st}$ to $5^{th}$ items, which further comprises a compound (D) having two or more oxirane groups or oxetane groups.

The $7^{th}$ item is a UV-curable ink-jet ink of the $6^{th}$ item, wherein the compound (D) having two or more oxirane groups or oxetane groups is one or more selected from compounds of formulae (7), (8), (9) and (10):

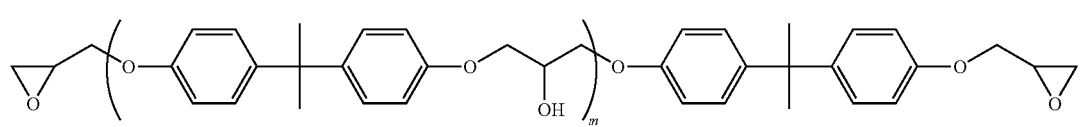

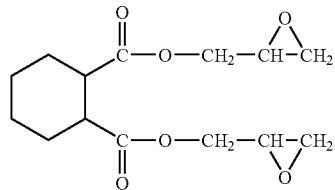

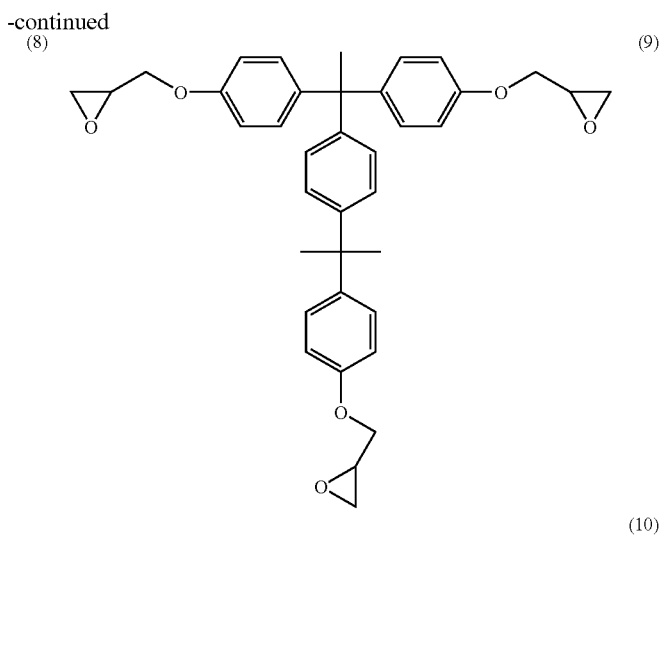

wherein in formula (7), m is an integer of 0-10.

The 8$^{th}$ item is an electronic circuit board, which includes a UV-cured film formed on a substrate by using a UV-curable ink-jet ink of any one of the 1$^{st}$ to 7$^{th}$ items.

The 9$^{th}$ item is an electronic component, which includes an electronic circuit board of the 8$^{th}$ item.

The 10$^{th}$ item is a display device, which includes an electronic component of the 9$^{th}$ item.

Effect of the Invention

The UV-curable ink-jet ink according to a preferred aspect of this invention has a high sensitivity and allows soft and highly fine patterns to be formed. The soft and highly fine patterns formed by using the UV-curable ink-jet ink can be applied to an electronic circuit board, especially a flexible electronic circuit board.

DESCRIPTION OF PREFERRED EMBODIMENTS

1. UV-Curable Ink-Jet Ink of this Invention

A preferred aspect of this invention is a UV-curable ink-jet ink that comprises a mono-functional polymerizable monomer (A) with a hydroxyl group, a di(meth)acrylate ester (B) and a photo-polymerization initiator (C), which can be colorless or colored.

1.1. Mono-Functional Polymerizable Monomer (A) having a Hydroxyl Group

In the UV-curable ink-jet ink of this invention, species of the mono-functional polymerizable monomer (A) having a hydroxyl group is not particularly limited, as long as it has the structure indicated by its name, preferably the structure of formula (1). Since the ink comprises a mono-functional polymerizable monomer (A) with a hydroxyl group, the ink diffuses less after the ink droplet is dropped onto a substrate, thereby allowing highly fine patterns to be formed.

Specific examples of the compound of formula (1) include 2-hydroxyethyl (meth)acrylate, 2-hydroxypropyl (meth) acrylate, 4-hydroxybutyl (meth)acrylate and 1,4-cyclohexanedimethanol mono(meth)acrylate. Considering the softness of the film formed, 4-hydroxybutyl (meth)acrylate and 1,4-cyclohexanedimethanol mono(meth)-acrylate are particularly preferred among them.

The mono-functional polymerizable monomer (A) having a hydroxyl group may be one of the above compounds, or alternatively a mixture of two or more compounds selected from the same.

1.2. Di(meth)acrylate ester (B)

In this invention, the di(meth)acrylate ester (B) is not particularly limited, as long as it is a compound having two (meth)acryloyl groups. However, considering high sensitivity, diacrylates are preferred. Specific examples of the di(meth)acrylate ester (B) include diacrylate modified by bisphenol-F ethylene oxide, diacrylate modified by bisphenol-A ethylene oxide, diacrylate modified by ethylene oxide isocyanurate, polyethyleneglycol diacrylate, polypropyleneglycol diacrylate, pentaerythritol diacrylate, pentaerythritol diacrylate monostearate, 1,4-butanediol diacrylate, 1,6-hexanediol diacrylate, 1,9-nonanediol diacrylate, 1,4-cyclohexanedimethanol diacrylate, 2-n-butyl-2-ethyl-1,3-propanediol diacrylate, trimethylolpropane diacrylate and dipentaerythritol diacrylate, etc. Considering the softness of the film formed, diacrylate modified by bisphenol-F ethylene oxide and diacrylate modified by bisphenol-A ethylene oxide are preferred. The di(meth)acrylate ester (B) may be one of the above compounds, or alternatively a mixture of two or more compounds selected from the same. As 20-500 weight parts of the di(meth)acrylate ester (B) is used along with 100 weight parts of the mono-functional polymerizable monomer (A) having a hydroxyl group, a high sensitivity can be achieved.

1.3. Photo-Polymerization Initiator (C)

The photo-polymerization initiator (C) of this invention is not specially limited, as long as it can produce radicals upon light irradiation. When 1-50 weight parts of the photo-polymerization initiator (C) is used along with 100 weight parts of the monomer (A), a high sensitivity can be achieved.

Specific examples of the photo-polymerization initiator (C) of this invention include benzophenone, Michler's ketone, 4,4'-bis(diethylamino)benzophenone, xanthone, thioxanthone, isopropylxanthone, 2,4-diethylthioxanthone, 2-ethyl anthraquinone, acetophenone, 2-hydroxy-2-methyl-propiophenone, 2-hydroxy-2-methyl-4'-isopropylpropiophenone, 1-hydroxycyclohexylphenyl ketone, isopropyl benzoin ether, isobutyl benzoin ether, 2,2-diethoxyacetophenone, 2,2-dimethoxy-2-phenyl-acetophenone, camphoroquinone, benzanthrone, 2-methyl-1-[4-(methylthio)phenyl]-2-morpholinopropane-1-one, 2-benzyl-2-dimethylamino-1-(4-morpholinophenyl)-1-butanone, ethyl 4-dimethylaminobenzoate, isoamyl 4-dimethylaminobenzoate, 4,4'-di(t-butylperoxycarbonyl)benzophenone, 3,4,4'-tri(t-butylperoxycarbonyl)-benzophenone, 2,4,6-trimethyl benzoyl diphenyl phosphine oxide, 2-(4'-methoxy-styryl)-4,6-bis(trichloromethyl)-s-triazine, 2-(3',4'-dimethoxystyryl)-4,6-bis(trichloro-methyl)-s-triazine, 2-(2',4'-dimethoxystyryl)-4,6-bis(trichloromethyl)-s-triazine, 2-(2'-methoxystyryl)-4,6-bis(trichloromethyl)-s-triazine, 2-(4'-pentyloxystyryl)-4,6-bis(trichloromethyl)-s-triazine, 4-[p-N,N-di(ethoxycarbonylmethyl)]-2,6-di(trichloromethyl)-s-triazine, 1,3-bis(trichloromethyl)-5-(2'-chlorophenyl)-s-triazine, 1,3-bis(trichloromethyl)-5-(4'-methoxyphenyl)-s-triazine, 2-(p-dimethylaminostyryl) benzoxazole, 2-(p-dimethylaminostyryl)benzthiazole, 2-mercaptobenzothiazole, 3,3'-carbonyl bis(7-diethylamino coumarin), 2-(o-chlorophenyl)-4,4',5,5'-tetraphenyl-1,2'-biimidazole, 2,2'-bis(2-chlorophenyl)-4,4',5,5'-tetrakis(4-ethoxycarbonylphenyl)-1,2'-biimidazole, 2,2'-bis(2,4-dichlorophenyl)-4,4',5,5'-tetraphenyl-1,2'-biimidazole, 2,2'-bis(2,4-dibromophenyl)-4,4',5,5'-tetraphenyl-1,2'-biimidazole, 2,2'-bis(2,4,6-trichlorophenyl)-4,4',5,5'-tetraphenyl-1,2'-biimidazole, 3-(2-methyl-2-dimethylamino-propionyl)carbazole, 3,6-bis(2-methyl-2-morpholinopropionyl)-9-n-dodecylcarbazole, 1-hydroxycyclohexyl phenyl ketone, titanium bis($\eta^5$-2,4-cyclopentadien-1-yl)-bis(2,6-difluoro-3-(1H-pyrrol-1-yl)-phenyl), 2-methyl-1-[4-(methylthio)phenyl]-2-morpholino-propane-1-one, 2-benzyl-2-dimethylamino-1-(4-morpholinophenyl)-1-butanone, compounds of formula (2):

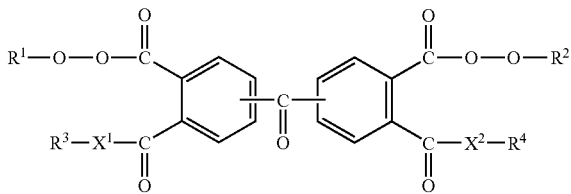

(2)

wherein $R^1$, $R^2$, $R^3$ and $R^4$ are independently $C_1$-$C_{13}$ alkyl and $X^1$ and $X^2$ are independently —O—, —O—O—, or —NH—, and compounds of formula (3):

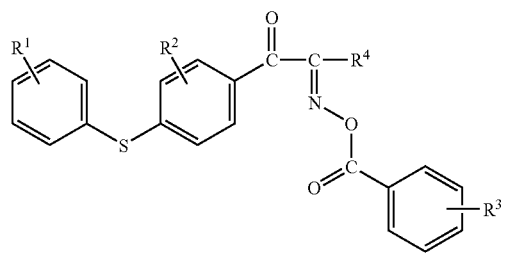

(3)

wherein $R^1$, $R^2$, $R^3$ are independently hydrogen or $C_1$-$C_5$ alkyl and $R^4$ is $C_1$-$C_{15}$ alkyl.

Specific examples of the compounds of formula (2) include 3,3',4,4'-tetra(t-butylperoxycarbonyl)benzophenone, 3,3',4,4'-tetra(t-hexylperoxycarbonyl)-benzophenone, 3,3'-di(methoxycarbonyl)-4,4'-di(t-butylperoxycarbonyl)benzophenone, 3,4'-di(methoxycarbonyl)-4,3'-di(t-butylperoxycarbonyl)benzophenone and 4,4'-di(methoxycarbonyl)-3,3'-di(t-butylperoxycarbonyl) benzophenone. Specific examples of the compounds of formula (3) include 1,2-octadione-1-[4-(phenylthio)phenyl]-2-(o-benzoyloxime), etc. The photo-polymerization initiator may be one of the above compounds, or alternatively a mixture of two or more compounds selected from the same.

The photo-polymerization initiator (C) preferably comprises, relative to its total weight, 20 wt % or more of one or more of the compounds of formulae (2) and (3), 2-methyl-1-[4-(methylthio)phenyl]-2-morpholinopropane-1-one and 2-benzyl-2-dimethylamino-1-(4-morpholinophenyl)-1-butanone, so that the UV-curable ink-jet ink obtained has a high sensitivity.

1.4. Compound (D) having Two or More Oxirane or Oxetane Groups

To improve the durability of the film formed, a compound (D) having two or more oxirane or oxetane groups can be added into the UV-curable ink-jet ink of this invention. To achieve sufficient effects, preferably about 1-50 weight parts of the compound (D) is added along with 100 weight parts of mono-functional polymerizable monomer (A) having a hydroxyl group. The compound (D) having two or more oxirane or oxetane groups of this invention is not particularly limited, as long as it has two or more oxirane or oxetane groups.

Examples of the compound (D) having two or more oxirane or oxetane groups include, bisphenol-A epoxy resin, glycidyl ester epoxy resin, alicyclic epoxy resin, polymers of monomers with an oxirane or oxetane group, and copolymers of monomers having an oxirane or oxetane group with other monomers, etc.

Specific examples of the compound (D) having two or more oxirane or oxetane groups include Epikote 807™, Epikote 815™, Epikote 825™, Epikote 827™, Epikote 828™, Epikote 190P™ and Epikote 191P™ produced by Yuka-Shell Epoxy Co., Ltd., Epikote 1004™ and Epikote 1256™ produced by Japan Epoxy Resins Co., Ltd., Araldite CY177™ and Araldite CY184™ produced by Japan Ciba-Geigy Co., Ltd., Celloxide 2021P™ and EHPE-3150™ produced by Daicel Chemical Industries Ltd., and Tecmoa VG3101L™ produced by Mitsui Chemicals Corporation. Additionally, Epikote 828™ is a mixture of compounds of formula (7), Araldite CY184™ is a compound of formula (8), Tecmoa VG3101L™ is a compound of formula (9), and Celloxide 2021P™ is a compound of formula (10).

Additionally, specific examples of monomers having an oxirane or oxetane group include glycidyl (meth)acrylate, 3,4-epoxycyclohexyl (meth)acrylate, methylglycidyl (meth)acrylate and 4-hydroxybutyl (meth)acrylate glycidyl ether, etc.

Specific examples of other monomers copolymerizable with a monomer having an oxirane or oxetane group include (meth)acrylic acid, methyl (meth)acrylate, ethyl (meth)acrylate, isopropyl (meth)acrylate, butyl (meth)acrylate, isobutyl (meth)acrylate, t-butyl (meth)acrylate, cyclohexyl (meth) acrylate, benzyl (meth)acrylate, 2-hydroxylethyl (meth)acrylate, 2-hydroxylpropyl (meth)acrylate, styrene, methylstyrene, chloromethylstyrene, (3-ethyl-3-oxetanyl)methyl (meth)acrylate, N-cyclohexylmaleimide and N-phenyl maleimide, etc.

Preferred specific examples of the polymers of the monomers having an oxirane or oxetane group include poly-glycidyl methacrylate, etc. Additionally, preferred specific examples of the copolymers of a monomer having an oxirane group with other monomers include methyl methacrylate/glycidyl methacrylate copolymer, benzyl methacrylate/glycidyl methacrylate copolymer, butyl methacrylate/glycidyl methacrylate copolymer, 2-hydroxylethyl methacrylate/glycidyl methacrylate copolymer, (3-ethyl-3-oxetanyl)methyl methacrylate/glycidyl methacrylate copolymer and styrene/glycidyl methacrylate copolymer.

1.5. Other Component

To improve the discharging property, storage stability of the ink and the durability of the film formed, the UV-curable ink-jet ink of this invention may further contain a solvent, a polymerization inhibitor, a mono-functional polymerizable monomer having no hydroxyl group, a multi-(meth)acrylate ester having three or more (meth)acryloyl groups and/or a colorant. The component(s) can be one of the above compounds, or alternatively a mixture of two or more compounds selected from the same.

1.5.1. Solvent

To improve the discharging property of the ink, the UV-curable ink-jet ink of this invention may also contain a solvent. Preferably, the solvent has a boiling point higher than or equal to 100° C. and has an amount making the solid content not less than 20%. Specific examples of the solvents having a boiling point higher than or equal to 100° C. include water, butyl acetate, butyl propionate, ethyl lactate, methyl oxyacetate, ethyl oxyacetate, butyl oxyacetate, methyl methoxyacetate, ethyl methoxyacetate, butyl methoxyacetate, methyl ethoxyacetate, ethyl ethoxyacetate, methyl 3-oxypropionate, ethyl 3-oxypropionate, methyl 3-methoxypropionate, ethyl 3-methoxypropionate, methyl 3-ethoxypropionate, ethyl 3-ethoxypropionate, methyl 2-oxypropionate, ethyl 2-oxypropionate, propyl 2-oxypropionate, methyl 2-methoxypropionate, ethyl 2-methoxypropionate, propyl 2-methoxypropionate, methyl 2-ethoxypropionate, ethyl 2-ethoxypropionate, methyl 2-oxy-2-methylpropionate, ethyl 2-oxy-2-methylpropionate, methyl 2-methoxy-2-methylpropionate, ethyl 2-ethoxy-2-methylpropionate, methyl pyruvate, ethyl pyruvate, propyl pyruvate, methyl acetoacetate, ethyl acetoacetate, methyl 2-oxobutyrate, ethyl 2-oxobutyrate, dioxane, ethyleneglycol, diethyleneglycol, triethyleneglycol, propyleneglycol, dipropyleneglycol, tripropyleneglycol, 1,4-butanediol, ethyleneglycol monoisopropyl ether, ethyleneglycol monobutyl ether, propyleneglycol monomethyl ether, propyleneglycol monomethyl ether acetate, propyleneglycol monoethyl ether acetate, propyleneglycol monopropyl ether acetate, ethylene glycol monobutyl ether acetate, cyclohexanone, cyclopentatone, diethyleneglycol monomethyl ether, diethyleneglycol monomethyl ether acetate, diethyleneglycol monoethyl ether, diethyleneglycol monoethyl ether acetate, diethyleneglycol monobutyl ether, diethyleneglycol monobutyl ether acetate, diethyleneglycol dimethyl ether, diethyleneglycol diethyl ether, diethyleneglycol methylethyl ether, toluene, xylene, anisole, γ-butyrolactone and N,N-dimethylacetamide.

The solvent preferably includes at least one selected from propyleneglycol monobutyl ether, propyleneglycol monomethyl ether acetate, propyleneglycol monoethyl ether acetate, methyl 3-methoxypropionate, ethyl 3-ethoxypropionate, diethyleneglycol monoethyl ether acetate, diethyleneglycol monobutyl ether acetate, diethyleneglycol dimethyl ether, diethyleneglycol methylethyl ether, ethyl lactate and anisole, so that the ink can be discharged stably.

1.5.2. Polymerization Inhibitor

To improve the storage stability, a polymerization inhibitor can be added into the UV-curable ink-jet ink of this invention. To achieve sufficient effects, preferably about 0.01-1 weight part of the polymerization inhibitor is added along with 100 weight parts of the mono-functional polymerizable monomer (A) having a hydroxyl group. When the amount of the polymerization inhibitor falls within the above range, a balance between the storage stability and high sensitivity of the ink can be achieved. Specific examples of the polymerization inhibitor include 4-methoxyphenol, hydroquinone and phenothiazine, etc.

1.5.3. Mono-Functional Polymerizable Monomer having no Hydroxyl Group

To improve the softness of the film formed, a mono-functional polymerizable monomer having no hydroxyl group can be added into the UV-curable ink-jet ink of this invention. To achieve sufficient effects, preferably about 1-50 weight parts of the mono-functional polymerizable monomer having no hydroxyl group is added along with 100 weight parts of the above monomer (A) having a hydroxyl group.

Specific examples of the mono-functional polymerizable monomer having no hydroxyl group include glycidyl (meth)acrylate, 3,4-epoxycyclohexyl (meth)acrylate, methylglycidyl (meth)acrylate, 3-methyl-3-(meth)acryloxymethyloxetane, 3-ethyl-3-(meth)acryloxymethyloxetane, 3-methyl-3-(meth)acryloxyethyloxetane, 3-ethyl-3-(meth)acryloxyethyloxetane, p-vinylphenyl-3-ethyloxetan-3-yl methyl ether, 2-phenyl-3-(meth)acryloxymethyloxetane, 2-trifluoromethyl-3-(meth)acryloxymethyl-oxetane, 4-trifluromethyl-2-(meth)acryloxymethyloxetane, (meth)acrylic acid, methyl (meth)acrylate, ethyl (meth)acrylate, isopropyl (meth)acrylate, butyl (meth)acrylate, isobutyl (meth)acrylate, t-butyl (meth)acrylate, cyclohexyl (meth)acrylate, benzyl (meth)acrylate, styrene, methylstyrene, chloromethylstyrene, (3-ethyl-3-oxetanyl)-methyl (meth)acrylate, N-cyclohexylmaleimide, N-phenylmaleimide, vinyltoluene, (meth)acrylamide, tricyclo[5.2.1.0$^{2,6}$]decyl (meth)acrylate, dicyclopentenyloxyethyl (meth)acrylate, isobornyl (meth)acrylate, phenyl (meth)acrylate, glycerol mono-(meth)acrylate, polystyrene macromonomer, polymethylmethacrylate macromonomer, N-acryloyl morpholine, 5-tetrahydrofurfuryloxycarbonylpentyl (meth)acrylate, (meth)acrylate of ethylene-oxide adduct of lauryl alcohol, (meth)acrylic acid, crotonic acid, α-chloroacrylic acid, cinnamic acid, maleic acid, fumaric acid, itaconic acid, citraconic acid, mesaconic acid, ω-carboxylpolycaprolactone mono(meth)acrylate, mono[2-(meth)acryloyloxyethyl]succinate, mono[2-(meth)acryloyloxyethyl]maleate and mono[2-(meth)acryloyloxyethyl]cyclohexenyl-3,4-dicarboxylate, etc.

1.5.4. Multi-(meth)acrylate Ester having Three or More (meth)acryloyl Groups

To improve the chemical resistance of the film formed, a multi-(meth)acrylate ester having three or more (meth)acryloyl groups can be added into the UV-curable ink-jet ink of this invention. To achieve enough effects, preferably about 1-50 weight parts of the multi-(meth)acrylate ester having three or more (meth)acryloyl groups is added along with 100 weight parts of the mono-functional polymerizable monomer (A) having a hydroxyl group. Specific examples of the multi-(meth)acrylate ester having three or more (meth)acryloyl groups include trimethylolpropane tri(meth)acrylate, trimethylolpropane tri(meth)acrylate modified by ethylene oxide, trimethylolpropane tri(meth)acrylate modified by propylene oxide, epichlorohydrin-modified trimethylolpropane tri (meth)acrylate, ditrimethylolpropane tetra(meth)acrylate, glycerol tri(meth)acrylate, epichlorohydrin-modified glycerol tri(meth)acrylate, diglycerin tetra(meth)acrylate, pentaerythritol tri(meth)acrylate, pentaerythritol tetra(meth)acrylate, dipentaerythritol penta(meth)acrylate, alkyl-modified dipentaerythritol penta(meth)acrylate, alkyl-modified dipentaerythritol tetra(meth)acrylate, alkyl-modified dipentaerythritol tri(meth)acrylate, dipentaerythritol hexa(meth)acrylate, caprolactone-modified dipentaerythritol hexa(meth)acrylate, phosphoric acid tri(meth)acrylate modified by ethylene oxide, tris[(meth)acryloxyethyl]isocyanurate, caprolactone-modified tris[(meth)acryloxyethyl]isocyanurate and urethane (meth)acrylate, etc. The multi-(meth)acrylate ester with three or more (meth) acryloyl groups may be one of the above compounds or alternatively a mixture of two or more compounds selected from the same.

1.5.5. Colorant

To easily identify the film and the substrate when examining the state of the film formed, a colorant can be added into the UV-curable ink-jet ink of this invention. To achieve sufficient effects, preferably about 1-50 weight parts of the colorant is added along with 100 weight parts of the mono-functional polymerizable monomer (A) having a hydroxyl group. Considering heat resistance, the colorant is preferably a pigment.

1.6. Preparation Method of the UV-Curable Ink-Jet Ink

The mono-functional polymerizable monomer (A) having a hydroxyl group, the di(meth)acrylate ester (B) and the photo-polymerization initiator (C) are mixed and dissolved to obtain the UV-curable ink-jet ink of this invention. To achieve sufficient effects, with respect to the mixing ratio, it is preferred to use 20-500 weight parts of the di(meth)acrylate ester (B) and 1-50 weight parts of the photo-polymerization initiator (C) along with 100 weight parts of the mono-functional polymerizable monomer (A) having a hydroxyl group. Further, to improve the durability of the film formed, a compound (D) having two or more oxirane or oxetane groups can be further added. To achieve sufficient effects, 1-50 weight parts of the compound (D) having two or more oxirane or oxetane groups are added along with 100 weight parts of the monomer (A). Moreover, to improve the discharging property and the storage stability of the ink, a solvent, a polymerization inhibitor, a mono-functional polymerizable monomer having no hydroxyl group, a multi-(meth)acrylate ester having three or more (meth)acryloyl groups and/or a pigment can be added.

1.7. Viscosity of the UV-Curable Ink-Jet Ink

When the viscosity of the UV-curable ink-jet ink of this invention is 3-300 mPa·s at 25° C., the ink has good discharging property. If the viscosity is higher than 20 mPa·s at 25° C., the ink can be discharged stably by heating the printing head to decrease the viscosity upon discharging.

1.8. Storage of the UV-Curable Ink-Jet Ink

When the UV-curable ink-jet ink of this invention is stored at a temperature between −20° C. and 20° C., the viscosity thereof is little changed, which means that the ink has good storage stability.

2. Method of Forming UV-Cured Film

After plotting any patterns by using an ink-jet apparatus and a UV-curable ink-jet ink of this invention, the pattern is irradiated by UV-light and then cured for 10-60 minutes at 120-250° C., so as to form a UV-cured film. When the wavelength of the UV-light is 365 nm, the dose thereof for the irradiation is preferably 10-1,000 mJ.

EXAMPLES

The following examples are intended to further explain this invention but not to limit the scope of this invention.

Example 1

To get the UV-curable ink-jet ink of this example, 4-hydroxybutyl acrylate (i.e., a compound of formula (1) in which $R^1$ is butylene, $R^2$ is hydrogen and n=1) as the mono-functional polymerizable monomer (A) having a hydroxyl group, a diacrylate modified by bisphenol-A ethylene oxide (Aronix M210™, referred to as "M210" hereinafter and produced by Toagosei Co., Ltd.) as the di(meth)acrylate ester (B), 2-benzyl-2-dimethylamino-1-(4-morpholinophenyl)-1-butanone (IRGACURE 369™, referred to as "I369" hereinafter and produced by Ciba Specialty Chemicals Co., Ltd.) as the photo-polymerization initiator (C), a bisphenol-A epoxy resin (Epikote 1007™, referred to as "EP1007" hereinafter and produced by Japan Epoxy Resins Co., Ltd.) as the compound (D) having two or more oxirane or oxetane groups and 4-methoxyphenol as the polymerization inhibitor were mixed with and dissolved in anisole as the solvent in the following composition ratio.

| | |
|---|---|
| 4-hydroxybutyl acrylate | 100.00 g |
| M210 | 100.00 g |
| I369 | 15.00 g |
| EP1007 | 20.00 g |
| 4-methoxyphenol | 0.05 g |
| anisole | 20.00 g |

The UV-curable ink-jet ink was injected into an ink-jet cartridge, and then the ink-jet cartridge was set in an ink-jet apparatus DMP-2811™ manufactured by Dimatix Co., Ltd. to plot, on a polyimide film "Kapton™" produced by Du Pont-Toray Co., Ltd. (150 μm thick, H-type, hereinafter referred to as "Kapton substrate"), in a manner such that the width of line/space is gradually changed from 20 μm to 200 μm in a step of 10 μm with a film thickness of 5 μm. After the plotting, the Kapton substrate was exposed in a dose of 100 mJ of 365 nm V-irradiation and then cured at 200° C. for 30 minutes. By observing the substrate with a microscope, it was found that when the width of line/space was 20-40 μm, the gaps partially collapsed due to the ink diffusion; when the width was larger than or equal to 50 μm, the plotting was successful. Additionally, after scrolling the substrate 100 times into a cylindrical shape having a radius of 2 mm with the plotted surface inside, it was observed in a microscope that no cracks occurred to the plotted patterns.

Example 2

To get the UV-curable ink-jet ink of this example, 4-hydroxybutyl acrylate and 1,4-cyclohexanedimethanol monoacrylate together as a mono-functional polymerizable monomer (A) having a hydroxyl group, a diacrylate modified by ethylene oxide isocyanurate (Aronix M215™, referred to as "M215" hereinafter and produced by Toagosei Co., Ltd.) as the di(meth)acrylate ester (B), I369 as the photo-polymerization initiator (C), Tecmoa VG3101L™ (referred to as "VG3101L" hereinafter and produced by Mitsui Chemicals Corporation) as the compound (D) having two or more oxirane or oxetane groups and phenothiazine as the polymerization inhibitor were mixed and dissolved in the following composition ratio.

| | |
|---|---|
| 4-hydroxybutyl acrylate | 100.00 g |
| 1,4-cyclohexanedimethanol monoacrylate | 50.00 g |
| M215 | 150.00 g |
| I369 | 10.00 g |
| VG3101L | 20.00 g |
| phenothiazine | 0.05 g |

The same evaluation as in Example 1 was done to the above UV-curable ink-jet ink. When the width of line/space was 20-40 μm, the gaps partially collapsed due to the ink diffusion; when the width was larger than or equal to 50 μm, the plotting was successful. Additionally, after scrolling the substrate 100 times into a cylindrical shape having a radius of 2 mm with the plotted surface inside, it was observed in a microscope that no cracks occurred to the plotted patterns.

Comparative Example 1

A UV-curable ink-jet ink in the following composition ratio was prepared, not containing a mono-functional polymerizable monomer (A) having a hydroxyl group.

| | |
|---|---|
| M210 | 180.00 g |
| I369 | 15.00 g |
| EP1007 | 20.00 g |
| 4-methoxyphenyl | 0.05 g |
| anisole | 40.00 g |

The above UV-curable ink-jet ink was injected into an ink-jet cartridge to plot patterns on a Kapton substrate in the same manner as in Example 1. After the plotting, the substrate was exposed in a dose of 100 mJ of 365 nm UV-irradiation and then cured at 200° C. for 30 minutes. By observing the substrate with a microscope, it was found that when the width of line/space was 20-110 μm, the gaps partially collapsed due to the ink diffusion; when the width was larger than or equal to 120 μm, the plotting was successful. Additionally, after scrolling the substrate 100 times into a cylindrical shape having a radius of 2 mm with the plotted surface inside, it was observed in a microscope that there are cracks occurring to the plotted patterns.

INDUSTRIAL UTILITY

The UV-curable ink-jet ink of this invention can be applied to, for example, manufacture of liquid crystal display devices and electronic circuit boards.

What is claimed is:

1. A UV-curable ink-jet ink, comprising a mono-functional polymerizable monomer (A) having a hydroxyl group, a di(meth)acrylate ester (B) and a photo-polymerization initiator (C), wherein the mono-functional polymerizable monomer (A) having a hydroxyl group is a compound of formula (1):

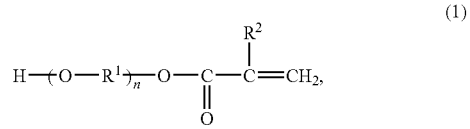

wherein $R^1$ is a $C_4$-$C_{12}$ alkylene group which is a straight chain or has a ring structure, $R^2$ is a $C_1$-$C_3$ alkyl group or hydrogen, and n is an integer of 1-30.

2. The UV-curable ink-jet ink of claim 1, wherein the di(meth)acrylate ester (B) is one or more selected from the group consisting of diacrylate modified by bisphenol-F ethylene oxide, diacrylate modified by bisphenol-A ethylene oxide, diacrylate modified by ethylene oxide isocyanurate, polyethyleneglycol diacrylate, polypropyleneglycol diacrylate, pentaerythritol diacrylate, pentaerythritol diacrylate monostearate, 1,4-butanediol diacrylate, 1,6-hexanediol diacrylate, 1,9-nonanediol diacrylate, 1,4-cyclohexanedimethanol diacrylate, 2-n-butyl-2-ethyl-1,3-propanediol diacrylate, trimethyloipropane diacrylate and dipentaerythritol diacrylate.

3. The UV-curable ink-jet ink of claim 1, wherein the di(meth)acrylate ester (B) is one or more selected from the group consisting of diacrylate modified by bisphenol-F ethylene oxide, diacrylate modified by bisphenol-A ethylene oxide and diacrylate modified by ethylene oxide isocyanurate.

4. The UV-curable ink-jet ink of claim 1, wherein the mono-functional polymerizable monomer (A) having a hydroxyl group is 4-hydroxybutyl (meth)acrylate or 1,4-cyclohexanedimethanol mono(meth)acrylate, the di(meth)acrylate ester (B) is one or more selected from the group consisting of diacrylate modified by bisphenol-F ethylene oxide, diacrylate modified by bisphenol-A ethylene oxide and diacrylate modified by ethylene oxide isocyanurate, and the photo-polymerization initiator (C) is 2-benzyl-2-dimethylamino-1-(4-morpholinophenyl)-1-butanone.

5. The UV-curable ink-jet ink of claim 1, further comprising a compound (D) having two or more oxirane groups or oxetane groups.

6. The UV-curable ink-jet ink of claim 5, wherein the compound (D) having two or more oxirane groups or oxetane groups is one or more selected from compounds of formulae (7), (8), (9) and (10):

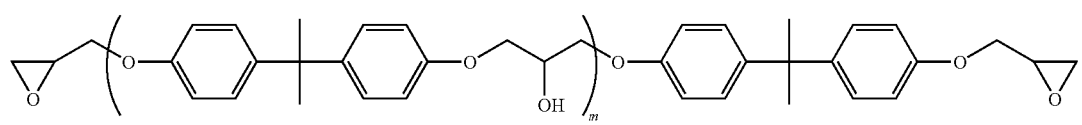

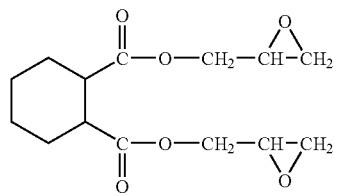
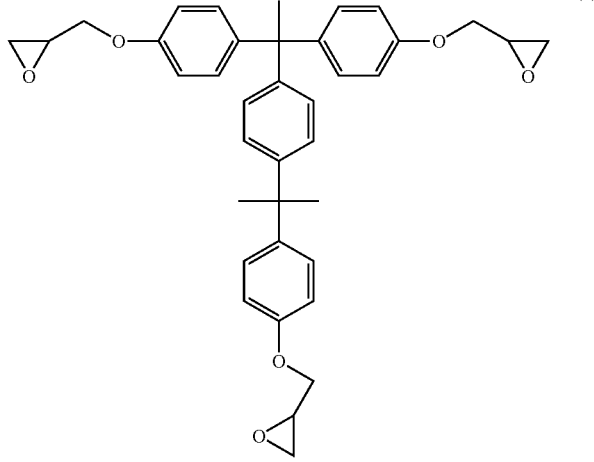
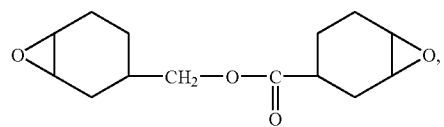
wherein in formula (7), m is an integer of 0-10.
* * * * *